(12) United States Patent
Vareljian

(10) Patent No.: US 7,050,574 B1
(45) Date of Patent: May 23, 2006

(54) TELEPHONE LINE INTERFACE CIRCUIT AND METHOD

(75) Inventor: Albert Vareljian, Nepean (CA)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/408,742

(22) Filed: Sep. 30, 1999

(51) Int. Cl.
*H04M 1/00* (2006.01)
*H04M 9/00* (2006.01)

(52) U.S. Cl. ............... 379/402; 379/391; 379/399.01

(58) Field of Classification Search ............ 379/90.01, 379/93.05, 380, 387.01, 388.06, 390.04, 379/394, 398, 402, 403, 413.02, 391, 399.01
See application file for complete search history.

(56) References Cited

U.S. PATENT DOCUMENTS

| | | | |
|---|---|---|---|
| 3,934,099 A | | 1/1976 | Elder, Jr. |
| 4,278,847 A | * | 7/1981 | Wortman ............... 379/405 |
| 4,878,241 A | * | 10/1989 | Gilbert ................. 379/106 |
| 5,541,990 A | * | 7/1996 | Rahamim ............... 379/402 |
| 5,734,703 A | * | 3/1998 | Hiyochi ................. 379/98 |
| 5,822,426 A | * | 10/1998 | Rasmus et al. ........... 379/402 |
| 6,538,986 B1 | * | 3/2003 | Isaksson et al. ......... 370/207 |

FOREIGN PATENT DOCUMENTS

EP      0 739 120      10/1996

OTHER PUBLICATIONS

European Search Report, EP 00 30 8181, dated Dec. 4, 2003.

* cited by examiner

*Primary Examiner*—Binh K. Tieu
(74) *Attorney, Agent, or Firm*—Lisa K. Jorgenson; Andre M. Szuwalski (57) ABSTRACT

A hybrid circuit is disclosed for effectively communicating information over a telecommunications line to which a transmitter and receiver are connected. The hybrid circuit is configured as a filter for filtering at the receiver input signals at predetermined frequencies appearing on the transmitter output and the telecommunications line. The filter circuit additionally forms a capacitive divider for scaling signals appearing at the transmitter output and canceling the scaled signals at the receiver input with related signals appearing on the telecommunications line. In one embodiment of the present invention for communicating using the ADSL protocol, the filter circuit is a first order high pass filter.

62 Claims, 2 Drawing Sheets

TELEPHONE LINE INTERFACE CIRCUIT AND METHOD

BACKGROUND OF THE INVENTION

1. Technical Field of the Invention

The present invention relates to an interface circuit for a telecommunications line, and particularly to a hybrid circuit for communicating over a telephone line.

2. Background of the Invention

Hybrid circuits have been used in modems or other communication devices to isolate the modem receiver from being affected by transmissions of the modem transmitter. Known hybrid circuits include a transformer circuit utilizing at least two transformers. Although somewhat effective in isolating the modem receiver path from the modem transmitter path, the transformer hybrid circuit is expensive to implement on an integrated circuit.

A second known hybrid circuit is a resistive divider circuit implemented in a resistor bridge configuration. The resistive divider circuit, however, degrades the signal strength of the signal transmitted over the telecommunications line and itself generates an appreciable amount of thermal noise due to the presence of resistors therein, thereby providing a relatively poor signal-to-noise ratio. Consequently, for handling communication over a relative high loss line, such as a twisted pair telephone line, a resistive divider hybrid circuit is not a perfect solution.

Other attempts to separate the receive path of a modem from the transmit path thereof include the use of a filter. In order to provide a substantially complete isolation of the received signals from the transmitted signals, however, a very high order filter having a relatively high dynamic range is required. As is well known, such filters are quite expensive to implement.

Based upon the foregoing, there exists a need for a hybrid circuit for a modem or other device which effectively and economically isolates the receive path from the transmit path.

SUMMARY OF THE INVENTION

The present invention overcomes the shortcomings in prior systems and thereby satisfies a significant need for a hybrid circuit for a modem or other device having a transmitter and a receiver associated with a telecommunications line, such as a telephone line on which information is communicated in two directions using the ADSL protocol. The hybrid circuit substantially cancels signals generated by the modem transmitter from appearing at the input of the modem receiver and filters signals, such as echo signals, at unwanted frequencies so that the receiver primarily receives at its input signals transmitted from a remote device.

In particular, the hybrid circuit includes a capacitive divider which suitably scales the signals generated by the transmitter and the signals appearing on the telecommunications line so that common portions of the two scaled signals substantially cancel each other at the receiver input. In addition, the capacitive divider is configured as a filter so that signal components at unwanted frequencies are substantially filtered from appearing at the receiver input. In the event the hybrid circuit receives downlink information from a remote device along the telecommunications line using the ADSL protocol, the capacitive divider is configured as a high pass filter.

In a preferred embodiment of the present invention, the hybrid circuit is associated with a differential pair of telecommunication lines over which information is communicated. The transmitter includes a differential output and the receiver includes a differential input. In this scenario, the hybrid circuit includes a pair of capacitive dividers, each of which is configured as a filter. In the event the hybrid circuit receives downlink information from a remote device over the telecommunications line using an ADSL protocol, each filter circuit is configured as a high pass filter. Alternatively, in the event the hybrid circuit receives uplink information from a remote device over the telecommunications line using an ADSL protocol, each filter circuit is configured as a low pass filter.

In a second preferred embodiment of the present invention, the hybrid circuit is associated with a single ended telecommunications line. Accordingly, the transmitter output and the receiver input are each single ended. The hybrid circuit in this embodiment includes a single capacitive divider configured as a filter. In use in receiving downlink information from a remote device over the telecommunications line using ADSL, the capacitive divider forms a high pass filter. Conversely, in receiving uplink information from a remote device over an ADSL telecommunications line, the capacitive divider forms a low pass filter. The hybrid circuit is connected between the transmitter output, receiver input and the telecommunications line. An inverting amplifier is connected between the transmitter output and one terminal of the capacitive divider so as to generate a signal that, after being suitably scaled by the capacitive divider, cancels like signal components appearing on the telecommunications line.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

Figure 1:
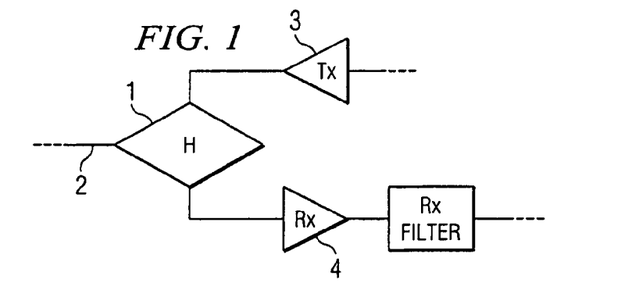
FIG. 1 is a function block diagram of a hybrid circuit according to the present invention in association with a transmitter and receiver.
Figure 2:
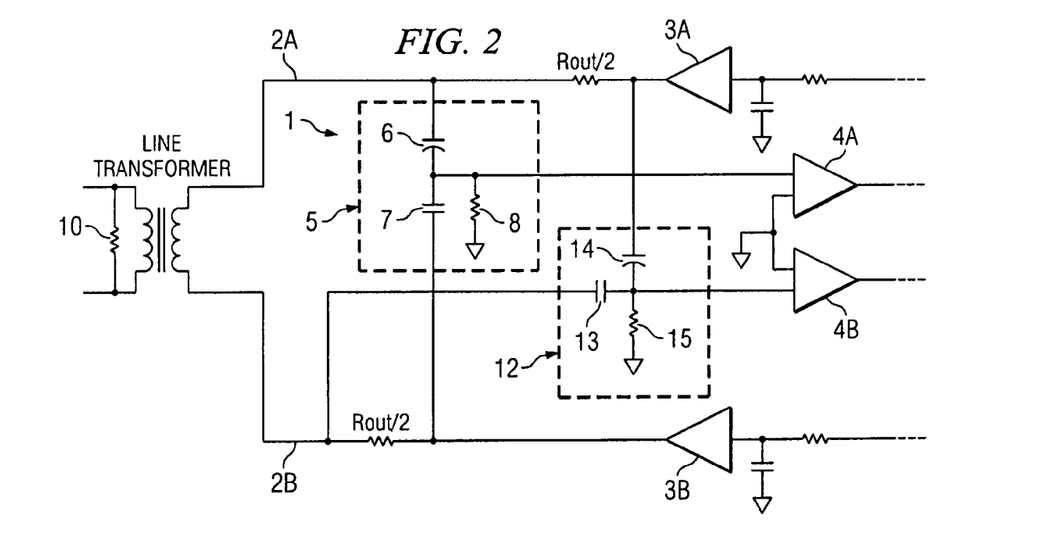
FIG. 2 is a schematic diagram of a hybrid circuit according to a first embodiment of the present invention.

Referring to FIGS. 1 and 2, there is shown a hybrid circuit 1 according to a preferred embodiment of the present invention. Hybrid circuit 1 is coupled to one end of a telecommunications line 2 over which information is communicated. Hybrid circuit 1 cooperates with transmitter 3 and receiver 4, each of which is coupled to telecommunications line 2. Transmitter 3 and receiver 4 respectively transmit and receive information over telecommunications line 2.

It is understood that hybrid circuit 1, transmitter 3 and receiver 4 may together form a modem or portion thereof. Alternatively, hybrid circuit 1 may be a stand-alone device.

In general terms, hybrid circuit 1 is electrically connected to transmitter 3, receiver 4 and telecommunication line 2 to substantially isolate the input of receiver 4 from signals generated by transmitter 3. Hybrid circuit 1 isolates the input of receiver 4 in part by canceling common signals appearing at the output of transmitter 3 and on telecommunications line 2. The remaining signal, a signal transmitted over telecommunications line 2 from a remote device, is applied to the input of receiver 4 for subsequent conditioning.

According to a preferred embodiment of the present invention shown in FIG. 2, hybrid circuit 1 is adapted for use with a two-wire telecommunications line 2. In this case, transmitter 3 has a differential output generated by transmitter elements 3A and 3B, and receiver 4 has a differential input that feeds receiver elements 4A and 4B. Transmitter element 3A is coupled to receiver element 4A and to telecommunications line 2A. Similarly, transmitter element 3B is coupled to receiver element 4B and to telecommunications line 2B. Transmitter elements 3A and 3B are each associated with an output resistor Rout.

In this first embodiment of the present invention, hybrid circuit 1 includes a pair of circuits. First circuit 5 is connected to a telecommunications line 2A, an output of transmitter element 3B and an input to receiver element 4A. First circuit 5 is a capacitive divider including a first capacitor 6 having a first terminal connected to telecommunications line 2A and a second terminal, a second capacitor 7 having a first terminal connected to the output of transmitter element 3B and a second terminal that is connected to the second terminal of capacitor 6, and a pull-down device 8 connected between the input of receiver 4A and ground. The signals at the outputs of elements 3A and 3B are already 180 degrees out of phase, being part of a differential system. The capacitance values of capacitors 6 and 7 are chosen to scale the voltages at line 2A and the output of transmitter element 3B and allow substantial cancellation of the signals appearing on telecommunications line 2A and the output of element 3B when added together at the input of receiver element 4A.

For example, in the event the output resistance Rout associated with transmitter elements 3A and 3B substantially matches the resistive load 10 of telecommunications line 2, the voltage level of the signal generated by transmitter element 3B is twice the voltage level of the related signal appearing at telecommunications line 2A. By assigning the capacitance value of C6 to be twice the capacitance value of capacitor C7, the output signal generated by transmitter element 3B is scaled by one third (⅓) at the input of receiver 4A and the corresponding signal appearing on transmission line 2A is scaled by two thirds (⅔) thereat. As can be seen, these signals cancel each other at the input of receiver element 4A. The resulting signal appearing at the input of receiver element 4A is a portion of the differential signal transmitted to receiver 4 by a remote transmitter.

In the event information is communicated over telecommunications line 2 using a protocol in which the uplink frequency range does not completely overlap the downlink frequency range, such as the ADSL protocol, the capacitive divider of first circuit 5 is configured as a filter for filtering signal components at unwanted frequencies (uplink or downlink) from appearing at the input of receiver element 4A. For use in an ADSL modem or other similar device which transmits signals to another device on the uplink and receives transmitted signals on the downlink, first circuit 5 is configured as a high pass filter. As shown in FIG. 2, pull-down device 8 is a resistor having a resistance value that, when combined with capacitors 6 and 7, substantially filters ADSL uplink signals transmitted by transmitter 3.

In a preferred embodiment of the present invention that is adapted for use with a two-wire telecommunications line 2, hybrid circuit 1 further includes a second circuit 12 which is electrically connected to telecommunications line 2B, the output of transmitter element 3A and the input of receiver element 4B. Second circuit 12 preferably mirrors first circuit 5 so as to correspondingly scale the output of transmitter element 3A and the related signal appearing on telecommunications line 2B relative to each other. In this way, the scaled signals cancel each other at the input to receiver element 4B so that receiver element 4B only receives signals transmitted by a remote transmitting device.

Similar to first circuit 5, second circuit 12 is implemented as a capacitive divider in order to suitably scale the signals for cancellation. Second circuit 12 preferably includes capacitor 13 having a first terminal connected to telecommunications line 2B and a second terminal, and capacitor 14 having a first terminal connected to the output of transmitter element 3A and a second terminal connected to the second terminal of capacitor 13. The capacitance values of capacitors 13 and 14 are chosen based upon the ratio of the signal voltage generated by transmitter element 3A to the signal voltage appearing on telecommunications line 2B due to the signal generated by transmitter element 3A. The capacitance values for capacitors 13 and 14 are chosen so that the ratio of the capacitance value of capacitor 13 to the capacitance value of capacitor 14 is the ratio of the voltage swing of the signal appearing at the output of transmitter element 3A to the voltage swing of the corresponding signal appearing on telecommunications line 2B. In this way, signals generated by transmitter 3A are substantially canceled at the input of receiver 4B.

In the event hybrid circuit 1 is associated with the communication of information using a protocol at which the frequency range of uplink signals does not completely overlap with the frequency range of corresponding downlink signals, the capacitive divider of second circuit 12 is configured as a filter. For a modem or other device utilizing the ADSL protocol for receiving downlink signals and transmitting uplink signals, second filter 12 is configured as a high pass filter to filter out uplink transmissions by transmitter element 3A. Resistor 15 of second circuit 12 is connected between the input of receiver element 4B and ground so as to cooperate with capacitors 13 and 14 in forming a high pass filter.

Figure 3:
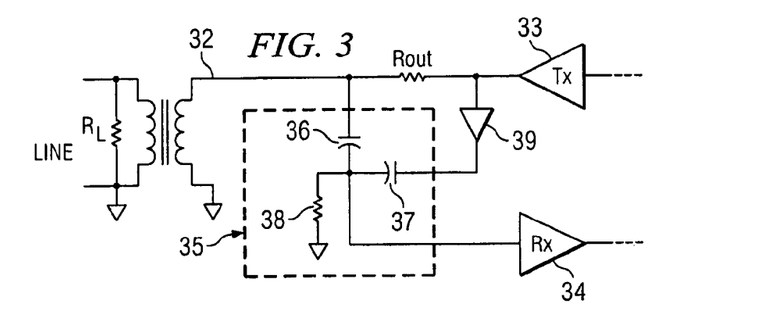
FIG. 3 is a schematic diagram of a hybrid circuit according to a second embodiment of the present invention.

Referring to FIG. 3, there is shown hybrid circuit 31 according to another preferred embodiment of the present invention for use with a single ended or one-wire telecommunications line. Hybrid circuit 31 is coupled to telecommunications line 32, the single ended output of transmitter 33, and the single ended input of receiver 34. Hybrid circuit 31 includes a capacitive divider circuit 35 for suitably scaling the output signal generated by transmitter 33 and the corresponding signal appearing on telecommunications line 32 so that they cancel each other at the input of receiver 34.

Specifically, capacitive divider circuit 35 includes a capacitor 36 having a first terminal connected to telecommunications line 32 and a second terminal, and capacitor 37 having a first terminal coupled to the output of transmitter 33 and a second terminal connected to the second terminal of capacitor 36. The capacitance values of capacitors 36 and 37 are chosen depending upon the ratio of the signal voltage generated by transmitter element 33 to the signal voltage appearing on telecommunications line 32 due to transmitter element 33. The capacitance values for capacitors 36 and 37 are chosen so that the ratio of the capacitance value of capacitor 36 to the capacitance value of capacitor 37 is the ratio of the voltage swing of the signal appearing at the output of transmitter element 33 to voltage swing of the corresponding signal voltage appearing on telecommunications line 32. In this way, signals generated by transmitter 33 are substantially canceled at the input of receiver 34.

In the event hybrid circuit 31 is associated with the communication of information using a protocol at which the frequency range of uplink signals does not completely overlap with the frequency range of corresponding downlink signals, the capacitive divider of capacitive divider circuit 35 is configured as a filter. For a modem or other device utilizing the ADSL protocol for receiving downlink signals and transmitting uplink signals, capacitive divider circuit 35 is configured as a high pass filter to filter out uplink transmissions. Resistor 38 of capacitive divider circuit 35 is connected between the input of receiver 34 and ground so as to cooperate with capacitors 36 and 37 in forming a high pass filter.

Because hybrid circuit 31 is associated with a single ended telecommunications line 32, in order for the signals scaled by hybrid circuit 31 to cancel at the input of receiver 34, hybrid circuit 31 further includes an amplifier circuit 39 having an input connected to the output of transmitter 33 and an output connected to the first terminal of capacitor 37. Amplifier circuit 39 is configured as an inverting amplifier. Amplifier circuit 39 inverts the voltage level of the output of transmitter 33 so as to produce an inverted voltage level which, following scaling by capacitive circuit 35, cancels the corresponding signal appearing on telecommunications line 32 that itself was scaled by capacitive circuit 35. In this way, the contribution of the signal appearing at the input of receiver 34 due to transmitter 33 is substantially minimized.

A benefit of employing reactive elements in the divider of the present hybrid circuit to scale the signals for cancellation is that, unlike circuits utilizing resistive elements to scale signals, reactive elements do not generate an appreciable amount of thermal noise. As a result, the signal-to-noise ratio of the receive path of the present modem is not adversely affected by the present hybrid circuit. Further, because the capacitive divider circuit of the present hybrid circuit is configured as a filter, any thermal noise generated by the resistive element therein is suitably filtered.

It is understood that with respect to the ADSL protocol, the receiving path for a modem or other communications device requires at least a third order filter. The filter(s) in the receiving path are normally downstream of an amplifier stage. By implementing hybrid circuit 1 as a first order high pass filter which is positioned upstream of the amplifier stage (FIG. 1), the filtering that is necessary downstream of the amplifier stage advantageously requires less complexity and can be implemented as an active filter implemented on an integrated circuit instead of an off-chip passive filter implemented using discrete L-C components.

Figure 4:
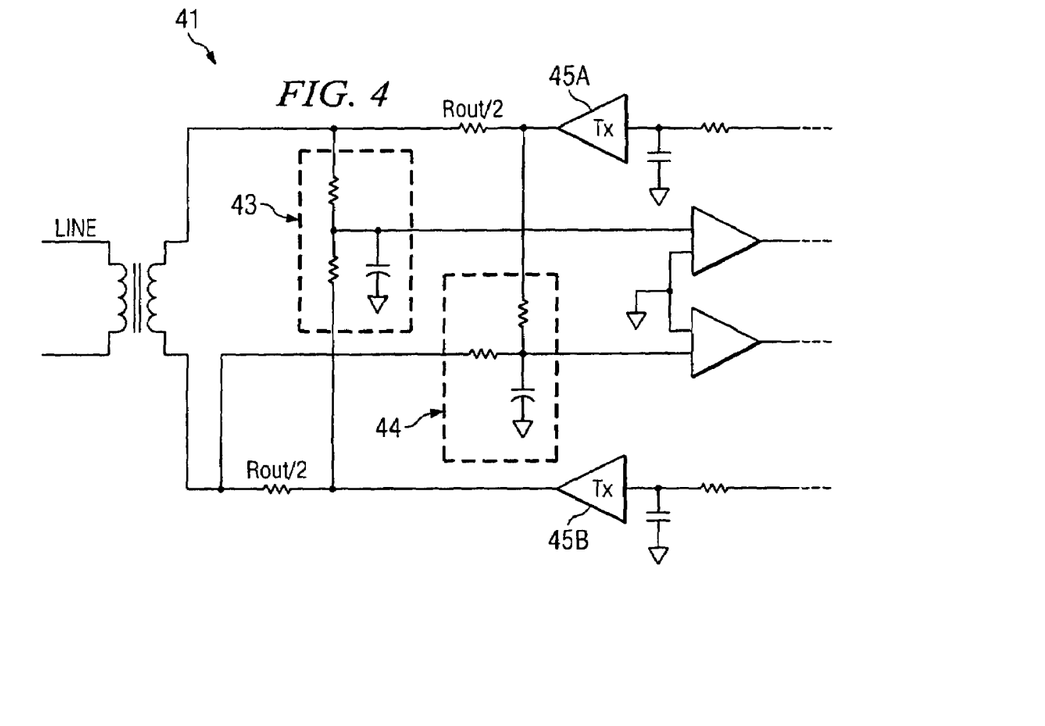
FIG. 4 is a schematic diagram of a hybrid circuit according to a third embodiment of the present invention.

It is understood that the present invention may be associated with a modem or other device including a transmitter for transmitting downlink information and a receiver for receiving uplink information at a different frequency range from the frequency range utilized by the transmitter, such as an uplink modem using the ADSL protocol. In this case, the hybrid circuit includes at least one resistive divider that is configured as a low pass filter. FIG. 4 illustrates a hybrid circuit 41 for an uplink modem or other device that communicates differential signals over telecommunications line 42 using ADSL. The primary difference between hybrid circuit 41 of FIG. 4 and hybrid circuit 1 of FIG. 2 is that each of first circuit 43 and second circuit 44 of hybrid circuit 41 is a resistive divider that is configured as a low pass filter via connection with a capacitor. First and second circuits being each configured as low pass filters suitably filters the higher frequency downlink transmissions by transmitter elements 45A and 45B.

Figure 5:
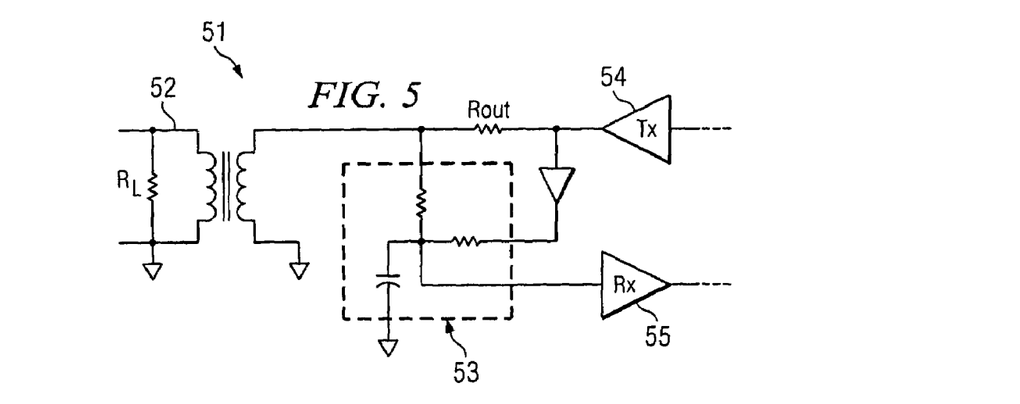
FIG. 5 is a schematic diagram of a hybrid circuit according to a fourth embodiment of the present invention.

Relatedly, FIG. 5 illustrates a hybrid circuit 51 for an uplink modem or other device that communicates single ended signals over telecommunications line 52 using ADSL. The primary difference between hybrid circuit 51 of FIG. 5 and hybrid circuit 31 of FIG. 3 is that the scaling circuit 53 is a resistive voltage divider that is configured as a low pass filter via connection with a capacitor. In this way, circuit 53 suitably filters the higher frequency downlink transmissions by transmitter element so that only uplink information transmitted by a remote device is received at the input to receiver 55.

It is understood that a higher order filter, either passive or active and either low-pass or high-pass, can be used instead of the first order filters mentioned above with respect to the preferred embodiments of the present invention. In this case, either the first capacitor or resistor of the higher order filter will be split to form a voltage divider.

It is also understood that additional wiring in the transmission line transformer can be used instead of an amplifier, or the counterphase signal tapped from the differential transmission line driver circuits (transmitter elements) to generate a counterphase voltage for subsequent signal cancellation in the hybrid circuit described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for transmitting and receiving signals over a communications line, comprising:
   a transmitter circuit having an output coupled to the communications line for transmitting signals in a first bandwidth;
   a receiver circuit having an input coupled to the communications line for receiving signals in a second, non-overlapping, bandwidth; and
   a hybrid circuit connected to the transmitter circuit output, the receiver circuit input and the communications line, the hybrid circuit being configured as a voltage divider formed from reactive elements for substantially canceling first bandwidth signals transmitted by the transmitter circuit from appearing with second bandwidth signals at the receiver input and for further filtering out signals received from the communications line at frequencies that fall within the first bandwidth.

2. The device of claim 1, wherein:
   the hybrid circuit comprises a first order filter.

3. The device of claim 1, wherein:
   the hybrid circuit comprises a high pass filter.

4. The device of claim 1, wherein:
   the hybrid circuit is configured as a capacitive divider for scaling the first bandwidth signals at the transmitter output for cancellation with related first bandwidth signals appearing on the communications line.

5. The device of claim 4, wherein the hybrid circuit comprises:
   a first capacitor having a first terminal connected to the communications line and a second terminal;
   a second capacitor having a first terminal connected to the transmitter circuit output and a second terminal connected to the second terminal of the first capacitor; and a resistor having a first terminal connected to the second terminal of the first capacitor and a second terminal connected to a reference voltage.

6. The device of claim 5, wherein:
the ratio between the capacitance of the first capacitor to the capacitance of the second capacitor is substantially the same as the ratio between the voltage level at the transmitter output to the voltage level of a related signal appearing on the communications line.

7. The device of claim 1, wherein:
the communications line comprises a differential pair of communications lines;
the transmitter output is a differential output;
the receiver input is a differential input; and
the hybrid circuit comprises a first filter circuit having a first terminal connected to a first line of the differential pair of communications lines, a second terminal connected to a first line of the differential output of the transmitter circuit and a third terminal connected to a first line of the differential input of the receiver circuit, the first filter circuit being configured as a voltage divider formed from reactive elements for substantially canceling first bandwidth signals transmitted by the transmitter circuit and appearing on the first terminal of the differential output thereof from appearing at the first line of the differential input of the receiver circuit.

8. The device of claim 7, wherein:
the hybrid circuit further comprises a second filter circuit having a first terminal connected to a second line of the differential pair of communications lines, a second terminal connected to a second line of the differential output of the transmitter circuit and a third terminal connected to a second line of the differential input of the receiver circuit, the second filter circuit being configured as a voltage divider formed from reactive elements for substantially canceling first bandwidth signals transmitted by the transmitter circuit and appearing on the second terminal of the differential output thereof from appearing at the second line of the differential input of the receiver circuit.

9. The device of claim 8, wherein:
the second filter circuit forms a capacitive divider.

10. The device of claim 8, wherein:
the second filter circuit comprises a pair of series connected capacitors connected between the second line of the differential pair of communications lines and the second line of the differential output of the transmitter circuit, and a resistor having a first terminal connected to each of the capacitors and a second terminal connected to a reference voltage.

11. The device of claim 8, wherein:
the second filter circuit comprises a first order, high pass filter.

12. The device of claim 8, wherein:
the first filter circuit and the second filter circuit each comprise a first order high pass filter.

13. The device of claim 7, wherein:
the first filter circuit forms a capacitive divider.

14. The device of claim 7, wherein:
the first filter circuit comprises a pair of series connected capacitors connected between the first line of the differential pair of communications lines and the second line of the differential output of the transmitter circuit, and a resistor having a first terminal connected to each of the capacitors and a second terminal connected to a reference voltage.

15. The device of claim 1 further comprising an amplifier circuit configured as an inverting amplifier that is connected between the transmitter circuit output and the hybrid circuit, the amplifier circuit and the hybrid circuit generating a first scaled output voltage signal and a second scaled voltage signal which cancel each other at the receiver circuit input.

16. A hybrid circuit associated with an end of a telecommunications line to which a DSL transmitter and a receiver are connected, comprising:
a first circuit having a first terminal coupled to an output of the DSL transmitter which transmits DSL signals in a first bandwidth, a second terminal coupled to an input of the DSL receiver which receives DSL signals in a second non-overlapping bandwidth and a third terminal coupled to the telecommunications line, for canceling first bandwidth signals transmitted by the DSL transmitter from appearing with second bandwidth DSL signals at the DSL receiver input and filtering first bandwidth DSL signals received from the telecommunications line from appearing at the DSL receiver input so that the DSL receiver is substantially isolated from the DSL transmitter, the first circuit forming a voltage divider of reactive elements that is configured as a filter.

17. The hybrid circuit of claim 16, wherein:
the first circuit comprises a high pass filter.

18. The hybrid circuit of claim 16, wherein:
the first circuit capacitively scales signals appearing at the output of the transmitter and on the telecommunications line so as to substantially cancel common signals therebetween.

19. The hybrid circuit of claim 18, wherein:
the first circuit is configured as a high pass filter.

20. The hybrid circuit of claim 18, wherein the first circuit comprises:
a first capacitor having a first terminal connected to the telecommunications line and a second terminal;
a second capacitor having a first terminal connected to the transmitter output and a second terminal connected to the second terminal of the first capacitor; and
a resistor connected between to the second terminal of the first capacitor and a reference voltage.

21. The hybrid circuit of claim 20, wherein:
the ratio between the capacitance value of the first capacitor to the capacitance value of the second capacitor is substantially the same as the voltage swing of signals at the transmitter output to the voltage swing of related signals appearing on the telecommunications line.

22. The hybrid circuit of claim 16, further comprising:
a second circuit configured as an inverting amplifier, the second circuit connected between the transmitter output and an input of the first circuit.

23. A hybrid circuit associated with an end of a two wire telecommunications line to which a transmitter and a receiver are connected, comprising:
a first circuit having a first terminal coupled to a differential output of the transmitter a second terminal coupled to a differential input of the receiver and a third terminal coupled to the telecommunications line for canceling signals transmitted by the transmitter from appearing at the receiver input and filtering signals at predetermined frequencies received from the telecommunications line from appearing at the receiver input so that the receiver is substantially isolated from the transmitter, the first circuit forming a voltage divider of reactive elements that is configured as a filter; wherein:
the first terminal of the first circuit is connected to a first line of the transmitter output, the second terminal of the first circuit is connected to a first line of the receiver input, and the third terminal of the first circuit is connected to a first line of the telecommunications line; and the hybrid circuit further comprises a second circuit having a first terminal connected to a second line of the transmitter output, a second terminal connected to a second line of the receiver input, and a third terminal connected to a second line of the telecommunications line, for canceling signals relating to signals generated by the transmitter and appearing at the second line of the receiver input, and for filtering signals on the second telecommunications line at predetermined frequencies from appearing at the second line of the receiver input, the second circuit forming a voltage divider of reactive elements that is configured as a filter.

24. The hybrid circuit of claim 23, wherein:

the second circuit capacitively scales signals appearing at the second output line of the transmitter and signals appearing on the second telecommunications line so that common signals therebetween cancel at the second line of the receiver input.

25. A hybrid circuit associated with an end of a telecommunications line to which a DSL transmitter and a DSL receiver are connected, comprising:

a first filter circuit connected to an output of the DSL transmitter which transmits DSL signals in a first bandwidth, the telecommunications line and an input of the DSL receiver which receives DSL signals in a second, non-overlapping, bandwidth, for filtering first bandwidth DSL signals at appearing on the transmitter output and received from the telecommunications line, scaling first bandwidth DSL signals appearing on the transmitter output, and canceling related first bandwidth DSL signals with the scaled first bandwidth DSL signals to prevent the related first bandwidth DSL signals from appearing with second bandwidth DSL signals received from on the telecommunications line at the DSL receiver.

26. The hybrid circuit of claim 25, wherein:

the first filter circuit is configured as a capacitive divider.

27. The hybrid circuit of claim 26, wherein:

the first filter circuit forms a high pass filter.

28. The hybrid circuit of claim 26, wherein:

the first filter circuit includes a first capacitor connected to the transmitter output, a second capacitor connected to the telecommunications line and a resistor connected to the first and second capacitors.

29. The hybrid circuit of claim 28, wherein:

the ratio of the capacitance value of the first capacitor to the capacitance value of the second capacitor is substantially the same as the voltage swing of the signals appearing on the transmitter output to the voltage swing of the related signals appearing on the telecommunications line.

30. The hybrid circuit of claim 25, wherein:

the first filter circuit forms a low pass filter.

31. A hybrid circuit associated with an end of a telecommunications line to which a transmitter and a receiver are connected, comprising:

a first filter circuit connected to an output of the transmitter, the telecommunications line and an input of the receiver, for filtering signals at predetermined frequencies appearing on the transmitter output and received from the telecommunications line, scaling signals appearing on the transmitter output, and canceling the scaled signals at the receiver input with related signals appearing on the telecommunications line, wherein:

the first filter circuit includes a first reactive component connected between the telecommunications line and the receiver input, a first electrical component connected between the transmitter output and the receiver input, and a second electrical component connected between the receiver input and a reference voltage.

32. A device for transmitting and receiving signals over a communications line, comprising:

a transmitter circuit having an output coupled to the communications line;

a receiver circuit having an input coupled to the communications line; and a hybrid circuit connected to the transmitter output, the receiver input and the communications line, for filtering signals at frequencies that fall outside of a predetermined frequency range, the hybrid circuit being configured as a capacitive divider for scaling the signals at the transmitter output for cancellation with related signals appearing at the receiver input, the capacitive divider comprising:

a first capacitor having a first terminal connected to the communications line and a second terminal;

a second capacitor having a first terminal connected to the transmitter output and a second terminal connected to the second terminal of the first capacitor; and a resistor having a first terminal connected to the second terminal of the first capacitor and a second terminal connected to a reference voltage.

33. The device of claim 32, wherein:

the ratio between the capacitance of the first capacitor to the capacitance of the second capacitor is substantially the same as the ratio between the voltage level at the transmitter output to the voltage level of a related signal appearing on the communications line.

34. A device for transmitting and receiving signals over a differential communications line, comprising:

a transmitter circuit having a differential output coupled to the differential communications line;

a receiver circuit having a differential input coupled to the differential communications line; and a hybrid circuit connected to the transmitter differential output, the receiver differential input and the differential communications line, the hybrid circuit comprises a first filter circuit having a first terminal connected to a first line of the differential communications line, a second terminal connected to a first line of the differential output of the transmitter circuit and a third terminal connected to a first line of the differential input of the receiver circuit, the first filter circuit being configured as a voltage divider formed from reactive elements for substantially canceling signals transmitted by the transmitter circuit and appearing on the first line of the differential output thereof from appearing at the first line of the differential input of the receiver.

35. The device of claim 34, wherein:

the hybrid circuit further comprises a second filter circuit having a first terminal connected to a second line of the differential communications line, a second terminal connected to a second line of the differential output of the transmitter and a third terminal connected to a second line of the differential input of the receiver, the second filter circuit being configured as a voltage divider formed from reactive elements for substantially canceling signals transmitted by the transmitter and appearing on the second line of the differential output thereof from appearing at the second line of the differential input of the receiver.

36. The device of claim 35, wherein:
the second filter circuit forms a capacitive divider.

37. The device of claim 35, wherein:
the second filter circuit comprises a pair of series connected capacitors connected between the second line of the differential pair of communications lines and the second line of the differential output of the transmitter, and a resistor having a first terminal connected to each of the capacitors and a second terminal connected to a reference voltage.

38. The device of claim 35, wherein:
the second filter circuit comprises a first order, high pass filter.

39. The device of claim 35, wherein:
the first filter circuit and the second filter circuit each comprise a first order high pass filter.

40. The device of claim 34, wherein:
the first filter circuit forms a capacitive divider.

41. The device of claim 34, wherein:
the first filter circuit comprises a pair of series connected capacitors connected between the first line of the differential pair of communications lines and the second line of the differential output of the transmitter, and a resistor having a first terminal connected to each of the capacitors and a second terminal connected to a reference voltage.

42. The device of claim 34, wherein:
the hybrid circuit further comprises an amplifier circuit configured as an inverting amplifier that is connected between the transmitter output and the first filter circuit, the amplifier circuit and the first filter circuit generating a first scaled output voltage signal and a second scaled voltage signal which cancel each other at the receiver input.

43. A hybrid circuit associated with an end of a two wire telecommunications line to which a differential transmitter and a differential receiver are connected, comprising:
a first circuit forming a voltage divider of reactive elements that is configured as a filter having a first terminal coupled to a first differential output of the transmitter, a second terminal coupled to a first differential input of the receiver and a third terminal coupled to a first wire of the telecommunications line;
a second circuit forming a voltage divider of reactive elements that is configured as a filter having a first terminal connected to a second differential output of the transmitter, a second terminal connected to a second differential input of the receiver, and a third terminal connected to a second wire of the telecommunications line;
the first and second circuits canceling signals transmitted by the transmitter from appearing at the receiver input and filtering signals at predetermined frequencies on the telecommunications line from appearing at the receiver input so that the receiver is substantially isolated from the transmitter.

44. The hybrid circuit of claim 43, wherein:
the second circuit capacitively scales signals appearing at the second output of the transmitter and signals appearing on the second wire of the telecommunications line so that common signals therebetween cancel at the second input of the receiver.

45. The hybrid circuit of claim 43, wherein:
the first circuit capacitively scales signals appearing at the first output of the transmitter and signals appearing on the first wire of the telecommunications line so that common signals therebetween cancel at the second input of the receiver.

46. A hybrid circuit associated with an end of a telecommunications line to which a transmitter and a receiver are connected, comprising:
a first circuit comprising:
a first capacitor having a first terminal connected to the telecommunications line and a second terminal;
a second capacitor having a first terminal connected to the transmitter output and a second terminal connected to the second terminal of the first capacitor; and
a resistor connected between to the second terminal of the first capacitor and a reference voltage;
the first circuit operable to cancel signals transmitted by the transmitter from appearing at the receiver input and filter signals at predetermined frequencies on the telecommunications line from appearing at the receiver input so that the receiver is substantially isolated from the transmitter.

47. The hybrid circuit of claim 46, wherein:
the first circuit comprises a high pass filter.

48. The hybrid circuit of claim 46, wherein:
the first circuit capacitively scales signals appearing at the output of the transmitter and on the telecommunications line so as to substantially cancel common signals therebetween.

49. The hybrid circuit of claim 46, wherein:
the first circuit is configured as a high pass filter.

50. The hybrid circuit of claim 46, wherein:
the ratio between the capacitance value of the first capacitor to the capacitance value of the second capacitor is substantially the same as the voltage swing of signals at the transmitter output to the voltage swing of related signals appearing on the telecommunications line.

51. The hybrid circuit of claim 46, further comprising:
a second circuit configured as an inverting amplifier, the second circuit connected between the transmitter output and an input of the first circuit.

52. A device for transmitting and receiving signals over a two wire communications line, comprising:
a differential transmitter circuit having a first and second outputs;
a differential receiver circuit having a first and second inputs; and
a hybrid circuit connected to the transmitter outputs, the receiver inputs and the two wire communications line, the hybrid circuit comprising:
a first voltage divider formed from reactive elements for substantially canceling signals transmitted by the first output of the differential transmitter circuit from appearing at the first input of the differential receiver circuit; and
a second voltage divider formed from reactive elements for substantially canceling signals transmitted by the second output of the differential transmitter circuit from appearing at the second input of the differential receiver circuit.

53. The device of claim 52, wherein each of the first and second voltage dividers is formed from a resistive voltage divider connected between one wire of the communications line and one of the differential transmitter outputs with a divider node of the resistive voltage divider connected to one of the differential receiver inputs, and further including a capacitor connected between the divider node and a reference voltage.

54. The device of claim 52, wherein each of the first and second voltage dividers is formed from a capacitive voltage divider connected between one wire of the communications line and one of the differential transmitter outputs with a divider node of the capacitive voltage divider connected to one of the differential receiver inputs, and further including a resistor connected between the divider node and a reference voltage.

55. A device for transmitting and receiving xDSL signals over a communications line, the xDSL signals possessing first and second non-overlapping transmission bandwidths, comprising:
- a transmitter circuit having an output coupled to the communications line for transmitting xDSL signals in the first bandwidth;
- a receiver circuit having an input coupled to the communications line for receiving xDSL signals in the second bandwidth; and
- a hybrid circuit connected between the transmitter output, the receiver input and the communications line, the hybrid circuit being configured as a voltage divider and filter circuit formed from reactive elements for substantially canceling first bandwidth signals transmitted by the transmitter circuit from appearing with second bandwidth signals at the receiver input and further filtering out first bandwidth signals that are not substantially canceled.

56. The device of claim 55, wherein the voltage divider and filter circuit comprises a first order filter.

57. The device of claim 55, wherein the voltage divider and filter circuit implements high pass filtering.

58. The device of claim 55, wherein the voltage divider and filter circuit includes a capacitive voltage divider, with a connected resistor to form the filter.

59. The device of claim 55, wherein the voltage divider and filter circuit includes a resistive voltage divider, with a connected capacitor to form the filter.

60. The device of claim 55, wherein:
- the communications line comprises a two wire communications line;
- the transmitter output is a differential output;
- the receiver input is a differential input; and the hybrid circuit comprises:
  - a first voltage divider and filter circuit connected between a first wire of the communications line, a first line of the differential transmitter output and a first line of the differential receiver input to substantially cancel and filter signals transmitted from the first line of the differential transmitter output from appearing at the first line of the differential receiver input; and
  - a second voltage divider and filter circuit connected between a second wire of the communications line, a second line of the differential transmitter output and a second line of the differential receiver input to substantially cancel and filter signals transmitted from the second line of the differential transmitter output from appearing at the second line of the differential receiver input.

61. The device of claim 55, wherein:
the hybrid circuit further comprises an amplifier circuit configured as an inverting amplifier that is connected between the transmitter output and the voltage divider and filter circuit to generate a first scaled output voltage signal which is substantially canceled at the receiver input by a second scaled voltage signal generated by the voltage divider and filter circuit.

62. A device for transmitting and receiving signals over a communications line, comprising:
- a transmitter circuit having an output coupled to the communications line;
- a receiver circuit having an input coupled to the communications line;
- a hybrid circuit connected to the transmitter circuit output, the receiver circuit input and the communications line, for filtering signals received from the communications line at frequencies that fall outside of a predetermined frequency range, the hybrid circuit being configured as a voltage divider formed from reactive elements for substantially canceling signals transmitted by the transmitter circuit from appearing at the receiver input; and
- an amplifier circuit configured as an inverting amplifier that is connected between the transmitter circuit output and the hybrid circuit, the amplifier circuit and the hybrid circuit generating a first scaled output voltage signal and a second scaled voltage signal which cancel each other at the receiver circuit input.

* * * * *

UNITED STATES PATENT AND TRADEMARK OFFICE
CERTIFICATE OF CORRECTION

PATENT NO. : 7,050,574 B1
APPLICATION NO. : 09/408742
DATED : May 23, 2006
INVENTOR(S) : Albert Vareljian It is certified that error appears in the above-identified patent and that said Letters Patent is hereby corrected as shown below:

Column 8, line 65,  Replace "as a filter; wherein:"
Claim 23  With --as a filter;--

Column 9, line 31,  Replace "signals at appearing"
Claim 25  With --signals appearing--

Signed and Sealed this

Tenth Day of April, 2007

JON W. DUDAS
*Director of the United States Patent and Trademark Office*